July 21, 1964  R. V. CANNING  3,141,329
SURFACE DEFECT MONITOR FOR FILAMENTS
Filed Sept. 18, 1962  2 Sheets-Sheet 1
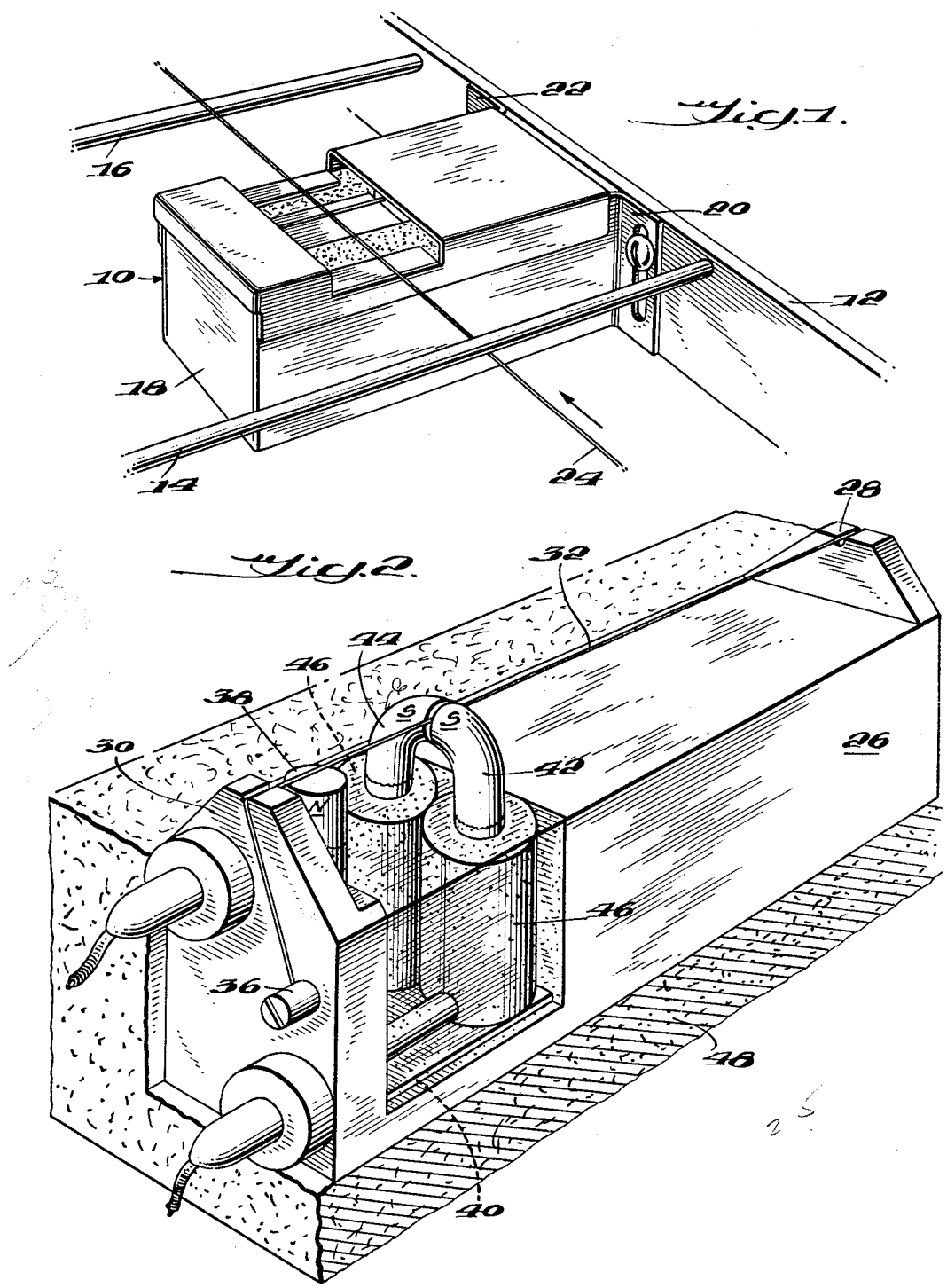

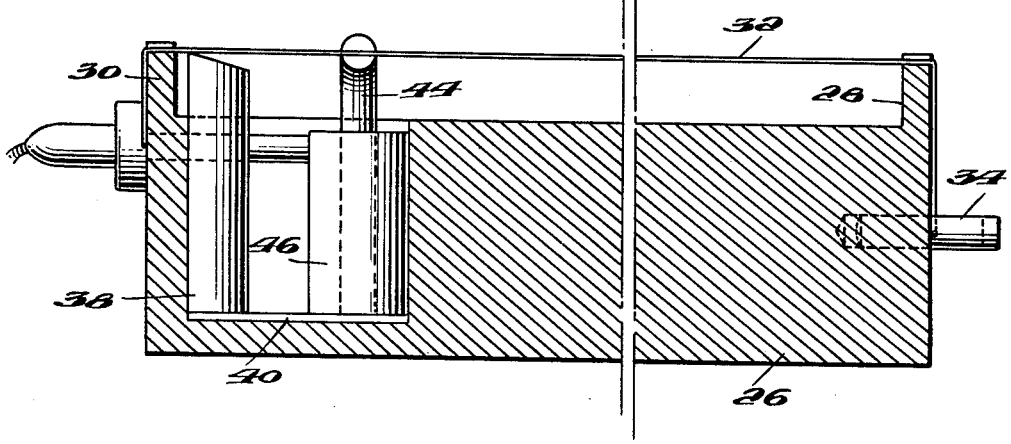
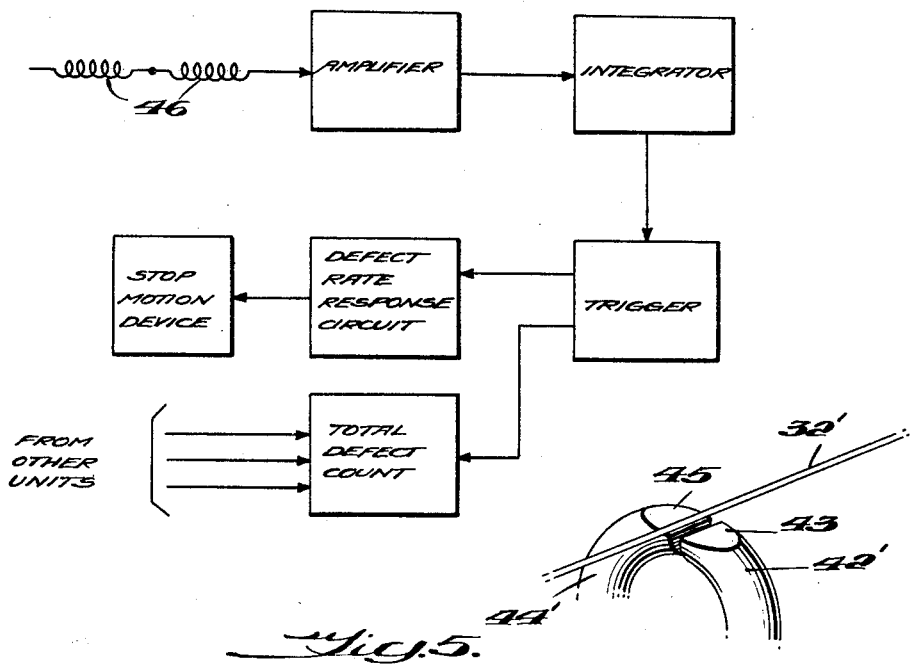

United States Patent Office 3,141,329
Patented July 21, 1964

1

3,141,329
SURFACE DEFECT MONITOR FOR FILAMENTS
Robert Vincent Canning, Wilmington, Del., assignor to E. I. du Pont de Nemours and Company, Wilmington, Del., a corporation of Delaware
Filed Sept. 18, 1962, Ser. No. 224,446
6 Claims. (Cl. 73—160)

This invention relates generally to the production of filamentary structures and more particularly to the in-process monitoring of surface defects and irregularities in continuously advancing yarns, threads, wires, and the like.

The most important object of the present invention is to provide an improved apparatus for monitoring surface defects protruding from a continuously advancing filamentary structure.

It is a corollary objective to provide a yarn defect detection apparatus adapted for coupling with simple, effective and reliable analysis and control circuitry.

These and other objectives are accomplished in a defect monitoring apparatus of the type which includes a stretched wire located in proximal traversing relationship to an axially advancing yarn. The wire is in a magnetic circuit which includes a magnet having spaced legs of opposite polarity, one of which is divided into branches having opposed ends normally equidistant from the wire, each branch having an induction coil associated therewith, the other leg being in terminal engagement with the wire. Circiutry is coupled with the coils for detecting variations in flux flow through the branches when the wire is vibrated by the impact of surface defects protruding from the yarn.

A somewhat similar apparatus in which a magnetic bender plate is so mounted in the length of a stretched wire as to vary the length and hence the reluctance of air gaps in a magnetic circuit has been disclosed by Taylor in FIG. 5 of U.S. 2,524,579. Although operable, the Taylor system is responsive only to very high frequency vibrations corresponding to the relatively short length of the plate. A further disadvantage is that, with the magnet elements attached to the detection wire, more mass must be vibrated. For these reasons, the apparatus is useful only in the detection and indication of major defects such as the broken slivers described by the patentee and is ineffective as a detector of broken filaments and similar minor defects.

The structural and operational advantages of the improvements claimed herein will be more apparent from the following description wherein reference is made to the accompanying drawings in which:

FIGURE 1 is a perspective view of the detection unit of the invention shown in association with a continuously advancing yarn;

FIG. 2 is an enlarged perspective view of the detection unit, parts having been omitted, broken away and shown in section to reveal details of construction;

FIG. 3 is a longitudinal, sectional view through the unit of FIG. 2;

FIG. 4 is a circuit diagram of monitoring circuit components useful with the detection unit of FIGS. 1–3; and FIG. 5 is a fragmentary, perspective view of an alternate embodiment of the branched pole shown in FIG. 2.

The apparatus embodiment chosen for purposes of illustration includes generally a detection unit 10, a support frame 12, yarn guides 14, 16 and circuitry coupled to unit 10 for analyzing and monitoring signals therefrom.

As shown in FIG. 1, unit 10 includes a casing 18 having slotted flanges 20, 22 by means of which it is adapted for adjustable attachment to support 12 in the desired relationship to a continuously advancing yarn 24.

Within casing 18, there is a block 26 of non-magnetic

2 material having upstanding, grooved end pieces 28, 30 over which a ferromagnetic wire 32 is stretched between an anchoring pin 34 and an adjustable tuning pin 36. Adjacent end piece 30, block 26 is cut away to receive a magnet assembly which includes a permanent magnet 38, a ferromagnetic base plate 40 and two ferromagnetic posts or branches 42, 44 bent in such a manner as to present opposed end faces equally spaced from wire 32. As shown in FIGS. 2, 3, the upper angularly disposed face of magnet 38 is in terminal edge contact with wire 32 which therefore serves to localize the flux path from magnet 38 to the branches 42, 44, i.e., the latter are of the same polarity and there are dual flux paths therethrough to base plate 40 and the opposite end of magnet 38.

Each of the branches is surrounded by a coil 46 of the type used in magnetic reluctance phonograph pick-up heads. Such coils have several hundred winding turns in order to insure induction of a usable e.m.f.

Any motion of wire 32 between the opposed faces of branches 42, 44 influences the air gap relutance of the dual flux paths and therefore increases and decreases flux flow in the respective branches. Such flux flow variations induce corresponding electromotive forces in the two coils 46 which are connected in series aiding relationship (FIG. 4) so that the two forces appear as their sum in the analysis circuitry which will be described more fully hereinafter. Thus, each transverse movement of the wire induces an e.m.f. in each coil, i.e., there are four inductions for eaceh vibrtion cycle. Since the magnet assembly is physically independent of the wire, its size and strength are dependent only on space limitations. The net effect is a detection unit which is very sensitive to lesser defects such as a broken filament.

Referring to FIG. 2, it is seen that the opening in block 26 which receives the magnet assembly is filled with a clear plastic, e.g., with an epoxy resin potting compound. Block 26 with its associated elements is embedded in a shock absorbing pad 48 of isocyanate foam which is so located in casing 18 as to expose wire 32 through the opening provided therefor.

In operation, detection unit 10 is positioned on support frame 12 with the exposed length of wire 32 in proximal traversing relationship to one or more yarns advancing continuously from their source, e.g., from the final stage in a yarn-drawing process. Normally, two small detection units are required for each yarn, one being mounted on each side thereof. In other instances, a single unit is positioned with its detection wire in traversing relationship to the multiple wraps of a yarn between a draw roll and its associated separator roll. At these early points in the process, detection of broken filaments, loops, slubs and the like facilitates remedial action before large quantities of off-standard yarn have been produced.

When wire 32 is properly positioned, it clears normal yarn and passable defects but is plucked into vibration at its resonant frequency by the impact of somewhat larger defects, e.g., by broken filaments protruding from yarn 24. Displacement of the wire causes a change in the reluctance of each air gap between wire 32 and branches 42, 44. The resulting flux variations induce minute voltage signals in the order of 200 microvolts in the series connected coils 46 which signals are forwarded from the detection unit 10 to a frequency discriminating amplification stage shown diagrammatically in FIG. 4. In addition to amplification of the combined low impedance signal, the amplifier is tuned to peak response at the resonant frequency of wire 32, e.g., 3000 cycles/second, and thus functions to reject any spurious signals of a different frequency which might be generated by electrical transients or machine vibrations.

At resonant frequencies of from 100–10,000 cycles/second, the impact of a defect with the tuned wire 32 sets it into vibration which normally is not damped out for a period of about 10–100 vibration cycles of decreasing amplitude. By comparison, machinery vibrations which penetrate the shock mounting 48 are usually of such low amplitude and frequency as to produce no significant vibration of the wire.

As a further safeguard against false outputs, the amplifier discharges to a coupled integrator component which requires several consecutive pulses to build up an adequate signal level for energization of the succeeding trigger component. These consecutive pulses are supplied by the "ringing" of the unencumbered wire following a sudden impact. In this manner, also, triggering by energy spikes resulting from amplified electrical transients picked up through the power system or from the surrounding environment is precluded. Reference to the circuit diagram of FIG. 4 shows that the trigger component feeds both a defect rate response component and a counter, either or both of which can be coupled directly to appropriate process control equipment.

An alternate embodiment of the branched magnet pole has been shown in FIG. 5. In this embodiment, branches 42′, 44′ have been cut away, leaving upper faces 43, 45 above which wire 32′ is positioned in a plane intersecting the opposed, partial, end faces of branches 42′, 44′. In this manner, the possibility of a reduction in wire response because of foreign matter accumulating between the end faces is avoided. The alternate embodiment is otherwise functionally the same as that shown in FIG. 2.

It is apparent that other changes and modifications may be made in the disclosed monitoring apparatus without departing from the spirit of the present invention which is therefore intended to be limited only by the scope of the appended claims.

Having thus described the invention, what is claimed as new and desired to be secured by Letters Patent is:

1. In a yarn defect monitoring apparatus,
   a magnet having upstanding legs of opposite polarity, one of said legs being bifurcated into spaced branches, a stretched wire in engagement with the other leg and passing in close proximity to said branches, the latter having terminal ends normally equidistant from the wire,
   and circuitry coupled with said branches for detecting flux flow variations therein,
   there being separate flux paths from said wire through said branches,
   said wire being located in proximal traversing relationship to an axially advancing yarn and therefore adapted for vibration by the impact of a yarn surface defect.

2. The defect monitoring apparatus of claim 1 wherein said circuitry includes induction coils surrounding each of said branches and coupled to an amplifier.

3. In combination with the impact responsive, stretched wire of a yarn defect detection apparatus, a magnetic circuit including
   a magnet having a bifurcated pole, presenting spaced branches, the terminal ends of which are normally equidistant from said wire,
   and an induction coil surrounding each of said branches,
   said wire also being in said magnetic circuit and adapted to change the flux flow in said branches when displaced by the impact of a yarn defect.

4. The defect monitoring apparatus of claim 3 wherein said coils are coupled to an amplifier-counter unit.

5. In a yarn defect monitoring apparatus,
   a stretched wire located in proximal traversing relationship to an axially advancing yarn,
   a magnet having spaced legs of opposite polarity, one of said legs being divided into branches having terminal ends normally equidistant from said wire, the other of said legs being in terminal engagement with said wire,
   and circuitry coupled with said branches for detecting flux flow changes in the magnetic paths therethrough from said wire,
   the latter being an impact sensor of defects protruding from the yarn.

6. An apparatus for monitoring surface defects in an axially advancing filamentary structure, said apparatus comprising:
   a support frame;
   means on said frame for guiding the axial travel of said structure;
   an elongated, flexible, ferromagnetic, detection element mounted on said frame in proximal, traversing relationship to said structure;
   a magnet having spaced legs of opposite polarity, one of said legs being divided into branches having terminal ends normally equidistant from said element, the other leg being in terminal engagement with said element, there being separate flux paths from said element through each branch;
   a coil surrounding each branch;
   and control circuitry coupled to said coils for utilization of signals induced therein when the element is vibrated by the impact of surface defects protruding from said structure.

No references cited.